United States Patent [19]

Nakamura et al.

[11] Patent Number: 4,996,893
[45] Date of Patent: Mar. 5, 1991

[54] SPEED CHANGE CONTROL DEVICE IN AUTOMATIC TRANSMISSION FOR AUTOMOBILE

[75] Inventors: Katsuma Nakamura; Hirofumi Shiba, both of Neyagawa, Japan

[73] Assignee: Kabushiki, Kaisha, Daikin, Seisakusho, Osaka, Japan

[21] Appl. No.: 391,602

[22] PCT Filed: Dec. 9, 1988

[86] PCT No.: PCT/JP88/01248

§ 371 Date: Jul. 26, 1989

§ 102(e) Date: Jul. 26, 1989

[87] PCT Pub. No.: WO89/05934

PCT Pub. Date: Jun. 29, 1989

[30] Foreign Application Priority Data

Dec. 17, 1987 [JP] Japan .................. 62-319696

[51] Int. Cl.$^5$ ........................... B60K 41/00
[52] U.S. Cl. ........................... 74/866; 74/877
[58] Field of Search ............... 74/866, 877; 364/424.1

[56] References Cited

U.S. PATENT DOCUMENTS

| | | | |
|---|---|---|---|
| 4,643,048 | 2/1987 | Hattori et al. | 74/877 X |
| 4,843,551 | 6/1989 | Milunas | 74/866 X |
| 4,848,529 | 7/1989 | Kurihara et al. | 74/866 X |
| 4,889,015 | 12/1989 | Kondo | 74/866 |
| 4,896,569 | 1/1990 | Ito et al. | 324/424.1 X |
| 4,913,006 | 4/1990 | Tsuyama et al. | 74/866 |

FOREIGN PATENT DOCUMENTS

| | | |
|---|---|---|
| 51-44763 | 4/1976 | Japan . |
| 51-22698 | 7/1976 | Japan . |
| 55-129647 | 10/1980 | Japan . |
| 58-31499 | 7/1983 | Japan . |

*Primary Examiner*—Dwight Diehl
*Attorney, Agent, or Firm*—Armstrong, Nikaido, Marmelstein, Kubovcik & Murray

[57] ABSTRACT

A speed change control device in an automatic transmission for an automobile (16) equipped with a storage means (3) storing a correlation between an accelerator opening and a vehicle speed by which a shifting in each speed stage is commenced, and its shift point being deviated so as to execute a shift-up operation at a constant high vehicle speed when an accelerator opening is smaller than or equal to a specified value. An accelerator opening rate-of-change computing means (14) computes a rate-of-change of an accelerator opening on the basis of a detection signal from an accelerator opening detector (12) detecting the accelerator opening. Further, a shift-up prohibiting means (15) prohibits a shift-up operation when the accelerator opening rate-of-change computed by the accelerator opening rate-of-change computing means (14) is more than or equal to a specified value.

4 Claims, 4 Drawing Sheets

SPEED CHANGE CONTROL DEVICE IN AUTOMATIC TRANSMISSION FOR AUTOMOBILE

TECHNICAL FIELD

This invention relates to a speed change control device in an automatic transmission for an automobile.

BACKGROUND ART

A speed change control device in an automatic transmission is composed for example of a microcomputer etc. and a correlation between an accelerator opening and vehicle speed by which a shifting of each speed stage is commenced in each range is stored as a shift map in a storage means composed of a memory etc. In a shift map of a conventional speed change control device, a shift point has moved toward a high speed side with an increase in an accelerator opening as shown by FIG. 5. Consequently, as indicated by arrows A and B in FIG. 5, an automatic transmission has carried out a shift-up operation when an accelerator pedal has been released during running under a state of a large accelerator opening, and the automatic transmission has carried out a shift-down operation when the accelerator pedal has been fully trod down from the foregoing state. In FIG. 5, an axis of abscissa denotes the vehicle speed and an axis of ordinate denotes the accelerator opening, a solid line C denotes a shift-up timing from 1st speed to 2nd speed, a solid line D denotes a shift-up timing from 2nd speed to 3rd speed, a broken line E denotes a shift-down timing from 2nd speed to 1st speed, and a broken line F denotes a shift-down timing from 3rd speed to 2nd speed, respectively.

A vehicle, such as a commercial car powered by a small engine torque relatively to its weight, has frequently subjected to a driving condition with an accelerator pedal opened to a large extent in a driving along a mountain road or in a driving with a heavy weight loaded, so that a vehicle equipped with a conventional speed change control device frequently encounters a so-called hunting state wherein shift-up and shift-down occur very often to cause a bad drive feeling in a driving along a mountain path such as a meandering road on which the accelerator pedal has to be opened and closed frequently. Further, when driving a road with frequent uphill and downhill, an engine braking effect has become worse due to the shift-up so that a driver has been forced to operate frequent braking actions.

DISCLOSURE OF THE INVENTION

In order to solve the foregoing problem, this invention provides a speed change control device in an automatic transmission for an automobile equipped with a storage means storing a correlation between an accelerator opening and a vehicle speed by which a shifting in each speed stage is commenced, characterized by that there provided an accelerator opening rate-of-change computing means computing a rate-of-change of an accelerator opening on the basis of a detection signal from an accelerator opening detector detecting the accelerator opening and a shift-up prohibiting means prohibiting a shift-up operation when the accelerator opening rate-of-change computed by the accelerator opening rate-of-change computing means is more than or equal to a specified value, and at the same time the correlation between the accelerator opening and the vehicle speed in storage means is preset in such a manner that a shift point is deviated so as to execute the shift-up operation at a constant high vehicle speed when an accelerator opening is smaller than or equal to a specified value.

According to the above-mentioned structure, the accelerator opening rate-of-change computing means computes the rate-of-change of the accelerator opening on the basis of the detection signal from the accelerator opening detector which detects the accelerator opening. And, the shift-up prohibiting means prohibits the shift-up operation when the accelerator opening rate-of-change computed by the accelerator opening rate-of-change computing means is more than or equal to a prescribed value. Consequently, the shift-up operation is not executed in case when the accelerator is opened and closed at a speed larger than a prescribed value, so that the repeated frequent shift-up/shift-down operations become unnecessary to improve the drive feeling. Further, the correlation between the accelerator opening and the vehicle speed in the storage means is built up in such the manner that the shift point is deviated so as to effect the shift-up operation at a constant high vehicle speed when the accelerator opening is smaller than the specified value, so that the shift-up operation is not executed even when the accelerator opening is suddenly throttled and kept at this state. As a result, an engine braking effect can be maintained and frequent braking actions are not required.

BEST MODE FOR CARRYING OUT THE INVENTION

Figure 1:
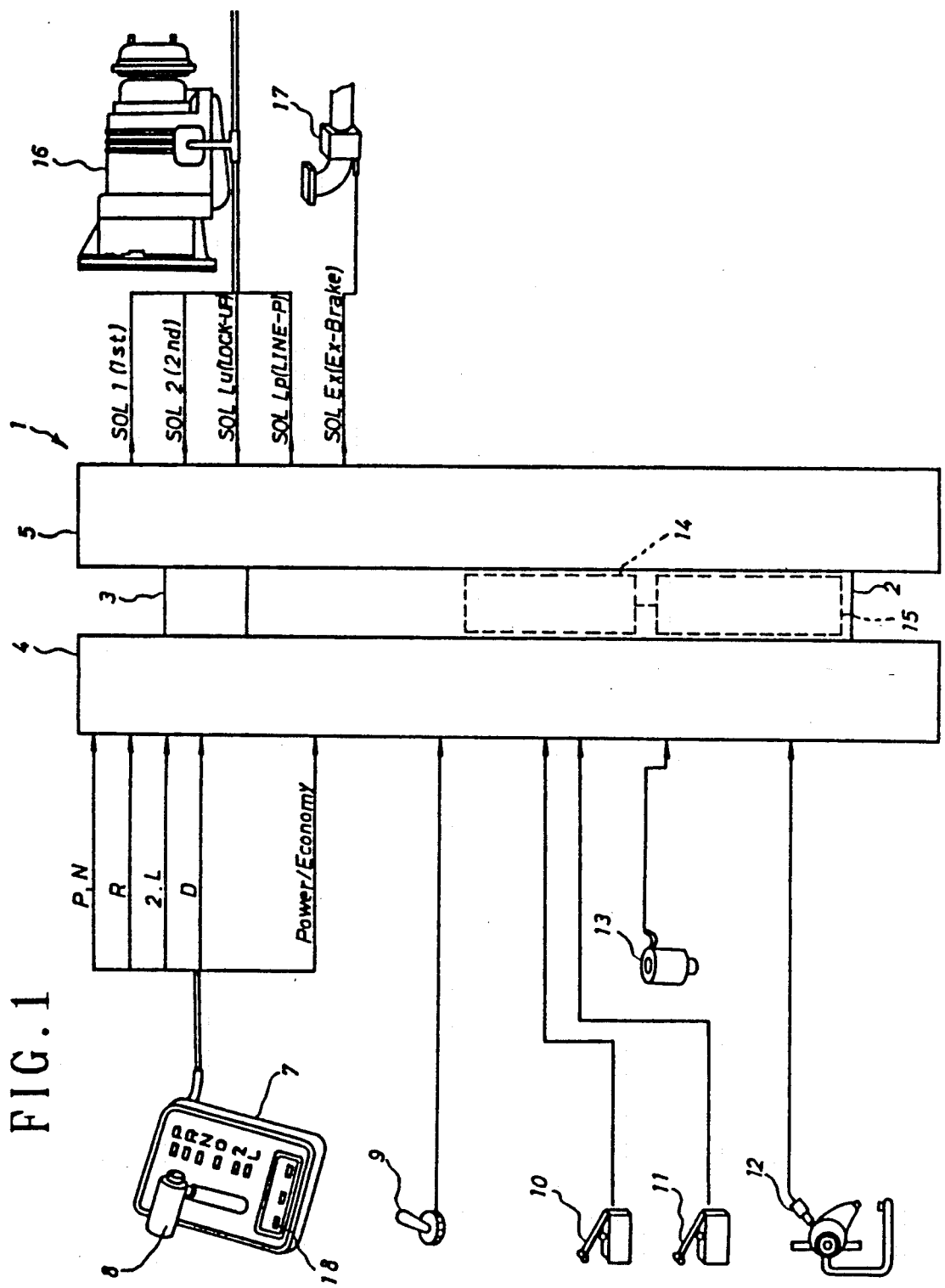
FIG. 1 is a schematic general block diagram of a speed change control device in an automatic transmission for an automobile in an embodiment of this invention.

In FIG. 1 which is the schematic general block diagram of a speed change control device in an automatic transmission for an automobile, a microcomputer 1 is composed of a CPU (central processing unit) 2 performing a processing function on the basis of a program, a storage means 3 consisting of ROM and RAM etc. and storing various data, an input interface 4 feeding various inputs to the CPU 2, and an output interface 5 feeding various outputs of the CPU to various control objects.

A shift tower 7 is a device for selecting a control mode by operating a select lever 8, and an operating switch 9 is a device for ON/OFF operation of an exhaust brake. An idle switch 10 is a device for detecting that an accelerator pedal (not shown) is not being trod at all, and a kick down switch 11 is a device for detecting that said accelerator pedal is being trod to its stroke limit. An accelerator opening detector 12 is a device for detecting an accelerator opening corresponding to a trod amount of said accelerator pedal, and a vehicle speed detector 13 is a device for detecting a vehicle speed. Outputs of these devices are entered through the input interface 4 into the CPU 2. Further, an accelerator opening rate-of-change computing means 14 computes the accelerator opening on the basis of a detection signal from the accelerator opening detector 12. A shift-up prohibiting means 15 prohibits a shift-up when the rate-of-change of accelerator opening computed by the accelerator rate-of-change computing means 14 is equal to or larger than a specified value. The accelerator opening rate-of-change computing means 14 and the shift-up prohibiting means 15 are composed of softwares by means of the CPU 2.

A control output from the CPU 2 is fed through the output interface 5 to a 1st speed solenoid, a 2nd speed solenoid, a lock-up solenoid and a line pressure solenoid for an automatic transmission 16 and a solenoid for an exhaust brake 17. Moreover, a power/economy change-over switch 18 consisting of a push button switch is disposed in the shift tower 7 so that a changing between an economy mode and a power mode is enabled by operating the power/economy change-over switch 18 under a state where a D-range is selected by the select lever 8. An output signal of the power/economy change-over switch 18 is entered in the CPU 2 through the input interface 4. The economy mode is a mode as used for a driving on flat ground or a driving with no load, in which a shift point is deviated to an early shifting side so as to give importance to economy of fuel consumption. On the other hand, the power mode is a mode as used for a driving on mountain road or a driving with a heavy weight loaded, in which the shift point is preset to utilize an engine power most effectively so as to give importance to a power.

Figure 2:
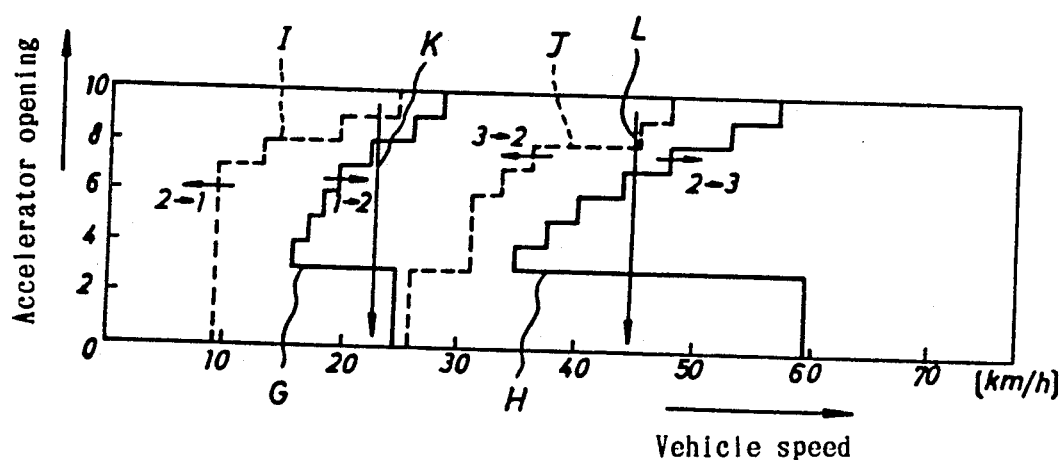
FIG. 2 is an explanatory diagram of a shift map of a power mode stored in a storage means.
Figure 5:
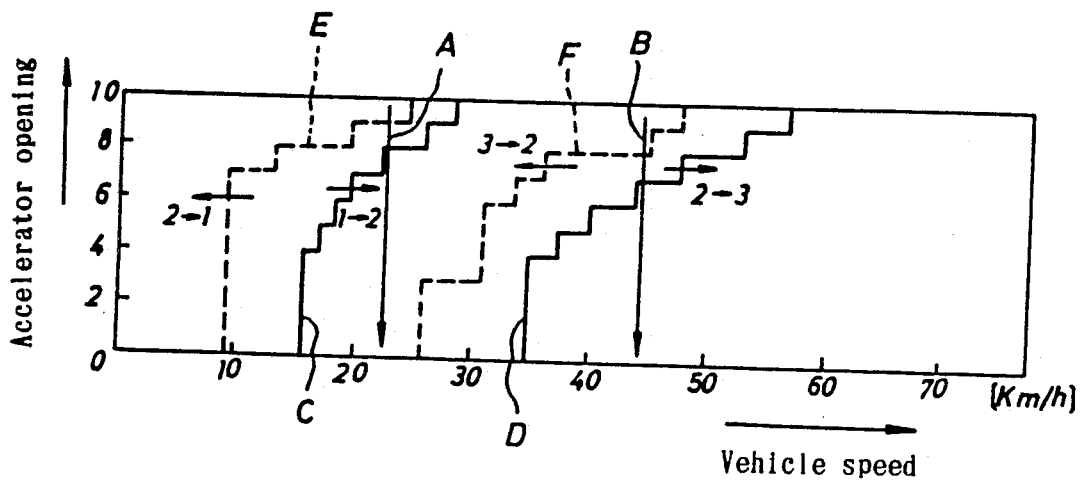
FIG. 5 is an explanatory diagram of a shift map in a conventional speed change control device.

In FIG. 2 which is the explanatory diagram of the shift map of the power mode among plural shift maps stored in the storage means 3, when the D-range is selected by the select lever 8 and the power mode is selected by the power/economy change-over switch 18, the CPU 2 reads out this shift map from the storage means 3 to carry out a shift control. In FIG. 2; an axis of abscissa denotes the vehicle speed, an axis of ordinate denotes the accelerator opening, a solid line G indicates a timing of shift-up from 1st speed to 2nd speed, a solid line H indicates a timing of shift-up from 2nd speed to 3rd speed, a broken line I indicates a timing of shift-down from 2nd speed to 1st speed, and a broken line J indicates a timing of shift-down from 3rd speed to 2nd speed, respectively. A feature of this shift map is that the point of shift-up below the accelerator opening 3 is deviated to a high vehicle speed side as compared with a conventional shift map shown in FIG. 5.

Figure 3:
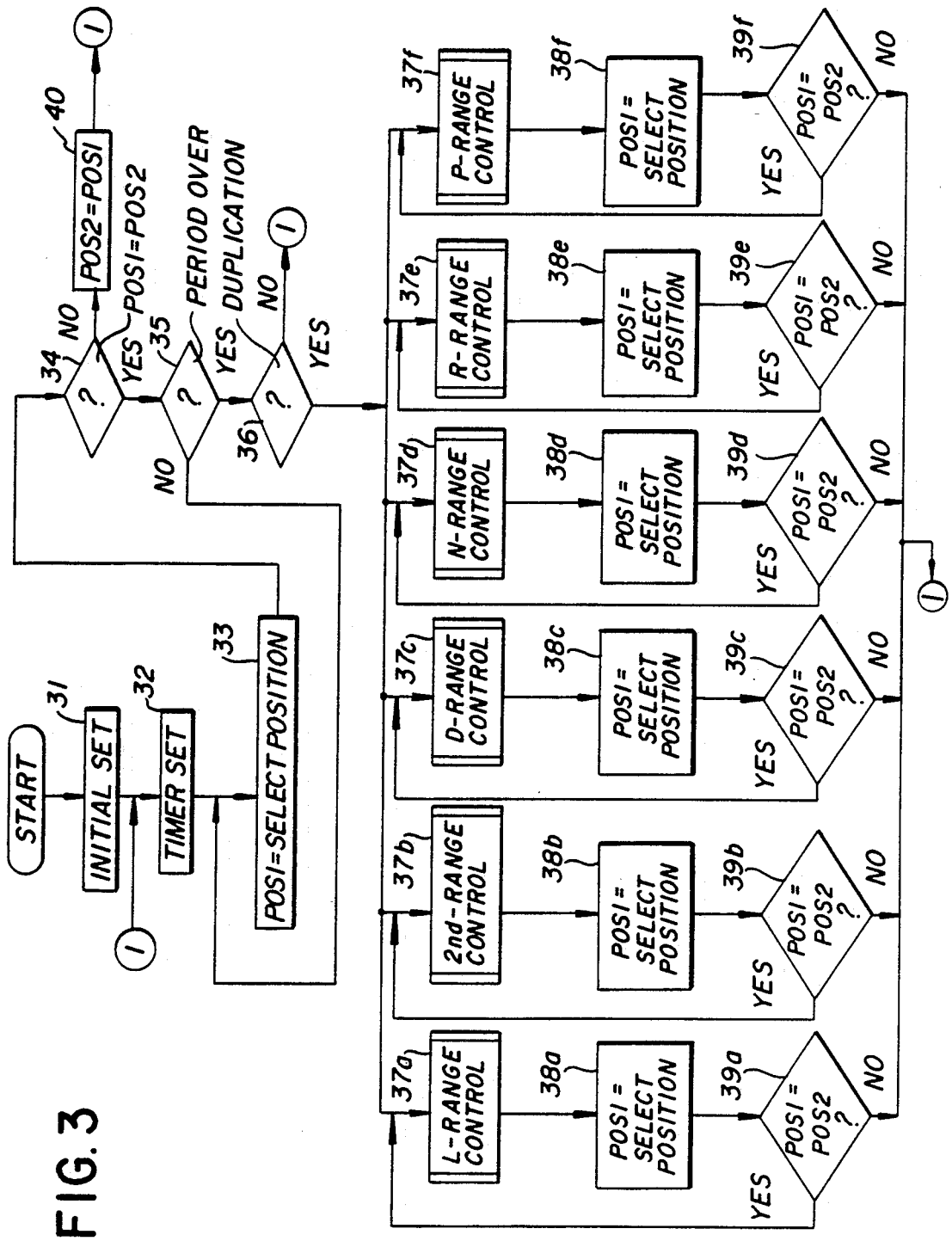
FIG. 3 is a flow chart showing an outline of a function of CPU.

In FIG. 3 which is the flow chart showing the outline of the function of CPU, the entire function will be described briefly hereunder because the function itself is the same as that of a conventional speed change control device for automatic transmission. In the first stage; the CPU carries out an initial setting in a step 31, it proceeds to a step 32 where it presets a program timer, then proceeds to a step 33 where it reads a range selected by the select lever 8 to make the range as a content of a register POS1. In the next stage; the CPU proceeds to a step 34 where it judges whether or not the content of the register POS1 coincides with a content of a register POS2, if they coincide each other it proceeds to a step 35 where it judges whether or not the period having been preset by the program timer in the step 32 is over. If the period is over, it proceeds to a step 36 where it judges whether or not signals are duplicated; if not, it proceeds to a step of range selected by the select lever 8 among steps 37a through 37f. The CPU carries out a control peculiar to each range in the steps 37a through 37f, and it proceeds to steps 38a through 38f to make a range selected by the select lever 8 as the content of the register POS1. Then, it proceeds to steps 39a through 39f where it judges whether or not the content of the register POS1 coincides with that of the register POS2; if they coincide, it returns to the steps 37a through 37f; if they do not, it returns to the step 32. On the other hand; if the content of the register POS1 does not coincide with that of the POS2 in the step 34, it proceeds to the step 40 where it makes the content of the POS1 coincide with that of the POS2, then returns to the step 32; if the period preset by the program timer is not over in the step 35, it returns to the step 33; and if it judges there is the duplication of signals in the step 36, it returns to the step 32.

Figure 4:
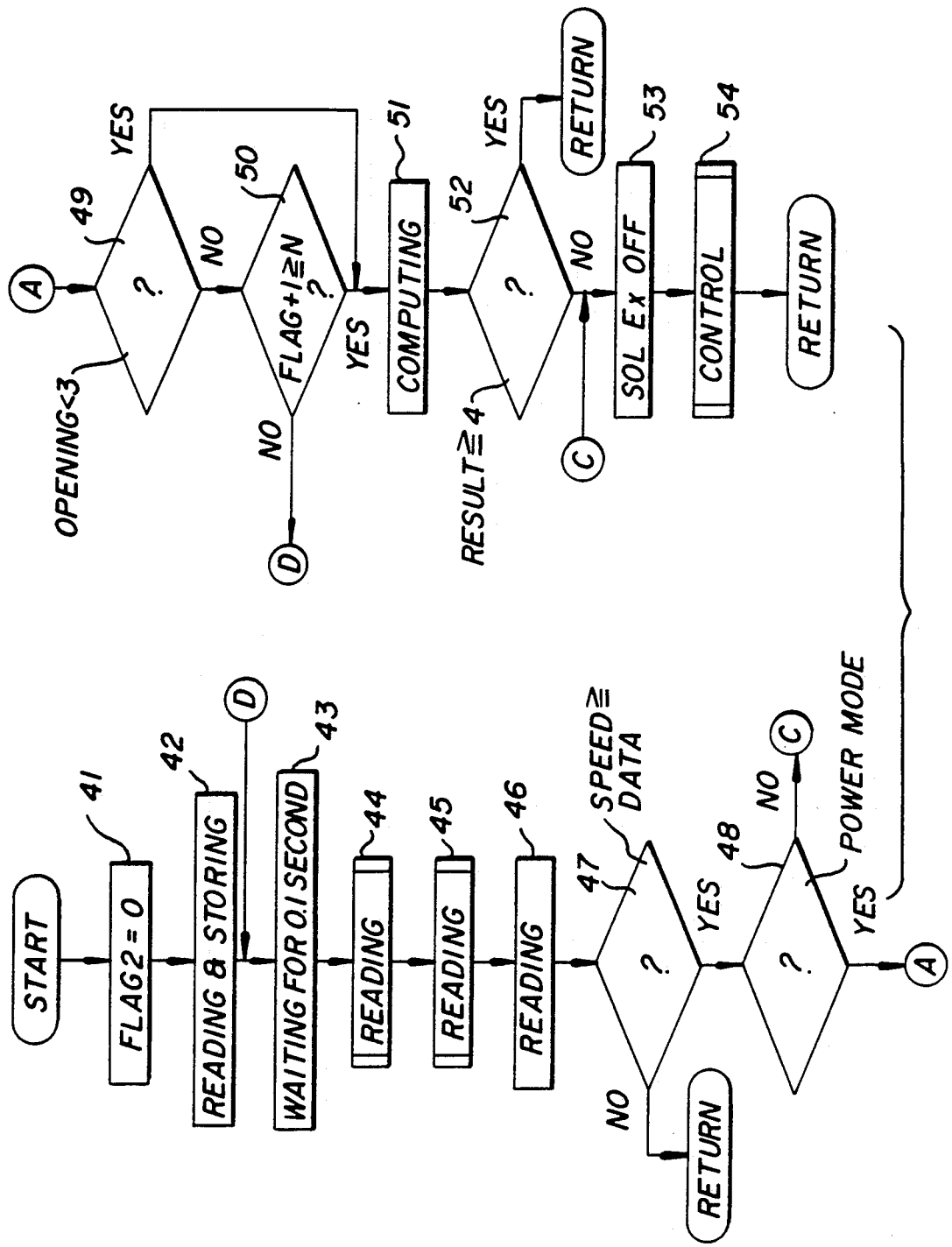
FIG. 4 is a flow chart of a shift-up operation in a drive range.

A shift-up control in the drive range control of the step 37c of FIG. 3 including a control peculiar to the present invention will be described in details with reference to a flow chart of FIG. 4. First, in a step 41 of FIG. 4, a content of a register FLAG2 is made as 0. Next, the CPU proceeds to a step 42 where it reads an output signal of the accelerator opening detector 12 to store the accelerator opening in the storage means 3. Then, it proceeds to a step 43 where it waits for 0.1 second. It proceeds to a step 44 where it reads the output signal of the accelerator opening detector 12 again to store the accelerator opening in the register. It further proceeds to a step 45 where it reads an output signal of the vehicle speed detector 13 to store a vehicle speed in the register. It proceeds to a step 46 where it reads out shift-up data indicated by the solid lines G & H from the storage means 3. It then proceeds to a step 47 where it compares the accelerator opening and vehicle speed stored in the steps 44 & 45 with the data read out in the step 46, and judges whether or not the vehicle speed is larger than the data value with respect to a present accelerator opening. If the vehicle speed is judged to be larger than the data value, it proceeds to a step 48 where it judges whether or not the power/economy switch 18 is changed over to the power mode. If it judges the switch is changed over to the power mode, it proceeds to a step 49 where it judges whether or not the accelerator opening stored in the register at the step 44 is smaller than 3. If it judges the accelerator opening is not smaller than 3, it proceeds to a step 50 where it adds 1 to a content of a register FLAG2 and at the same time judges whether or not the result is equal to or larger than a previously prescribed specified value N. If it judges the result is equal to or larger than the specified value N, it proceeds to a step 51 where it computes an absolute value of difference between the accelerator opening stored in the storage means 3 at the step 42 and the accelerator opening stored in the register at the step 43. Then, it proceeds to a step 52 where it judges whether or not the result computed in the step 51 is equal to or larger than 4. If the result is judged not to be equal to or larger than 4, it proceeds to a step 53 where it turns a solenoid for exhaust brake to OFF. It proceeds to a step 54 where it carries out a shift-up control, then it returns.

While, if the CPU judges the vehicle speed is not equal to or larger than the data value in the step 47, it returns. If it judges the switch is not changed over to the power mode in the step 48, it proceeds to the step 53. If it judges the accelerator opening is smaller than 3 in the step 49, it proceeds to the step 51. If it judges the result of adding 1 to the content of the register FLAG2 is not equal to or larger than the previously prescribed specified value N in the step 50, it returns to the step 43. Further, if the computed result is judged to be equal to or larger than 4 in the step 52, the CPU returns.

As described above, the shift-up operation is not executed when the accelerator opening is equal to or larger than 4 under the condition where the D-range is selected by the select lever 8 and the power mode is selected by the power/economy change-over switch 18, so that the speed stage is not shifted up even when an abrupt operation of the accelerator pedal is done frequently on a curved road etc. during the driving on mountain road or the driving with heavy weight loaded, to cause the accelerator opening to change rapidly from an approximately full opened state to an approximately full closed state as shown by an arrow K or L of FIG. 2, or to change rapidly from the approximately full closed state to the approximately full opened state. Therefore, even when the abrupt operation of the accelerator pedal is frequently done, frequent repeating of unnecessary shift-up/shift-down called as a hunting does not occur to eliminate an uncomfortable feeling and to improve a drive feeling. Moreover, since a shift-up point is preset to a high vehicle speed side at an accelerator opening of smaller than 3, the shift-up is not done and therefore a good engine braking effect can be maintained even when the accelerator opening is changed rapidly from the approximately full opened state to the approximately full closed state as indicated by the arrow K or L in the foregoing description.

An automatic transmission with three forward speeds has been described in the above-mentioned embodiment. However, this invention is not limited to such a structure, but the speed change control device according to the present invention may naturally be applicable to an automatic transmission with two forward speeds or with four forward speeds or more.

Further, in the foregoing embodiment, the explanation has been made with reference to the automatic transmission changeable between the power mode and the economy mode in the D-range. However, this invention is not limited to such a structure, but the speed change control device according to the present invention may naturally be applicable to an automatic transmission which is not changeable between the power mode and the drive mode in the D-range.

As described above, this invention provides the speed change control device in the automatic transmission for the automobile equipped with the storage means storing the correlation between the accelerator opening and the vehicle speed by which the shift-up of each speed stage is commenced, characterized by that there provided the accelerator opening rate-of-change computing means computing the rate-of-change of the accelerator opening on the basis of the detection signal from the accelerator opening detector detecting the accelerator opening and the shift-up prohibiting means prohibiting the shift-up operation when the accelerator opening rate-of-change computed by the accelerator opening rate-of-change computing means is more than or equal to a specified value. Accordingly, the speed stage is not shifted up even when the abrupt operation of the accelerator pedal is done frequently on a curved road etc. during the driving on mountain road or the driving with heavy weight loaded, to cause the accelerator opening to change rapidly from the approximately full opened state to the approximately full closed state or to change rapidly from the approximately full closed state to the approximately full opened state. Therefore, even when the abrupt operation of the accelerator pedal is frequently done, frequent repeating of unnecessary shift-up/shift-down called as the hunting does not occur to eliminate the uncomfortable feeling and to improve the drive feeling. Further, the correlation between the accelerator opening and the vehicle speed in the storage means is built up in such the manner that the shift point is deviated so as to effect the shift-up operation at the constant high vehicle speed when the accelerator opening is smaller than the specified value so that, in cooperation with the shift-up prohibiting function, the shift-up operation is not executed even when the accelerator opening is suddenly throttled and kept at this state. As the result, the engine braking effect can be maintained and the frequent braking actions becomes not required.

INDUSTRIAL APPLICABILITY

As described above, this invention provides the speed change control device in the automatic transmission for the automobile equipped with the storage means storing the correlation between the accelerator opening and the vehicle speed by which the shift-up of each speed stage is commenced so that, as the result of the control, the invention is effectively applicable to the improvement in the drive feeling and at the same time to maintain the engine braking effect at a good condition.

What is claimed is:

1. A speed change control device in an automatic transmission for an automobile equipped with a storage means for storing a correlation between an accelerator opening an a vehicle speed by which a shifting in each speed stage is commenced, said device comprising an accelerator opening rate-of-change computing means for computing a rate-of-change of an accelerator opening on the basis of a detection signal from an accelerator opening detector for detecting the accelerator opening and a shift-up prohibiting means for prohibiting a shift-up operation when the accelerator opening rate-of-change computed by the accelerator opening rate-of-change computing means is more than or equal to a specified value, and at the same time the correlation between the accelerator opening and the vehicle speed in said storage means is preset in such a manner that a shift point is deviated so as to execute the shift-up operation at a constant vehicle speed when the accelerator opening is smaller than or equal to a specified value, said constant vehicle speed being higher than a vehicle speed at which shift-up occurs when the accelerator opening is larger than said specified value.

2. A speed change control device in an automatic transmission for an automobile as set forth in claim 1, further comprising a microcomputer controlling said accelerator opening rate-of-change computing means and said shift-up prohibiting means.

3. A speed change control device in an automatic transmission for an automobile as set forth in any one of claim 1 or claim 2, further comprising a power-/economy switch means changing a drive mode between a power mode and an economy mode.

4. A speed change control device in an automatic transmission for an automobile as set forth in claim 3, in which the accelerator opening rate-of-change computing means and the shift-up prohibiting means function when the power mode is selected by the power-/economy switch means and a D-range is selected by a select lever.

* * * * *